(12) United States Patent
Yu et al.

(10) Patent No.: US 7,172,528 B2
(45) Date of Patent: Feb. 6, 2007

(54) TRANSFER CASE WITH OVERDRIVE/UNDERDRIVE SHIFTING

(75) Inventors: Andy Yu, Saline, MI (US); Fredric H. Tubbs, Grand Blanc, MI (US); Thomas J. Foster, Utica, MI (US)

(73) Assignee: BorgWarner Inc., Auburn Hills, MI (US)

( * ) Notice: Subject to any disclaimer, the term of this patent is extended or adjusted under 35 U.S.C. 154(b) by 171 days.

(21) Appl. No.: 10/773,108

(22) Filed: Feb. 5, 2004

(65) Prior Publication Data

US 2004/0220009 A1    Nov. 4, 2004

Related U.S. Application Data

(60) Provisional application No. 60/458,486, filed on Mar. 28, 2003.

(51) Int. Cl.
*F16H 3/44* (2006.01)
(52) U.S. Cl. .................. 475/311; 475/201; 475/204; 475/316
(58) Field of Classification Search ............... 475/198, 475/199, 201, 204, 311, 314, 316
See application file for complete search history.

(56) References Cited

U.S. PATENT DOCUMENTS

| | | | |
|---|---|---|---|
| 3,164,036 A | 1/1965 | Lamburn et al. | |
| 3,908,485 A * | 9/1975 | Miyauchi et al. | ........... 477/117 |
| 4,223,572 A | 9/1980 | Weiertz et al. | |
| 4,696,205 A | 9/1987 | Marks | |
| 4,706,520 A | 11/1987 | Sivalingam | |
| 4,798,103 A | 1/1989 | Eastman et al. | |
| 5,358,458 A | 10/1994 | Hicks | |
| 5,511,639 A * | 4/1996 | Sherman | ........... 188/77 R |
| 5,538,482 A | 7/1996 | Tanzer et al. | |
| 5,588,928 A * | 12/1996 | Koivunen | ........... 475/126 |
| 6,066,065 A * | 5/2000 | Breen | ........... 475/312 |
| 6,612,959 B2 * | 9/2003 | Frost | ........... 475/288 |
| 2002/0035003 A1 | 3/2002 | Brown et al. | |
| 2002/0107101 A1 | 8/2002 | Bowen et al. | |
| 2002/0142878 A1 | 10/2002 | Bansbach et al. | |

FOREIGN PATENT DOCUMENTS

| | | | |
|---|---|---|---|
| EP | 0 684 153 A1 | 11/1995 | |
| EP | 1 036 691 A2 | 9/2000 | |
| JP | 4-248028 | * 9/1992 | ........... 475/323 |

\* cited by examiner

*Primary Examiner*—Ha Ho
(74) *Attorney, Agent, or Firm*—Warn, Hoffmann, Miller & LaLone, P.C.; Greg Dziegielewski

(57) ABSTRACT

A transfer case for a vehicle that includes a planetary gear assembly, a clutch pack assembly, and a band and drum assembly that provide an overdrive or underdrive and direct drive in combination with a vehicle transmission. In one embodiment, an input shaft drives an outer ring gear of the planetary gear assembly and is coupled to one set of discs of the clutch assembly. A carrier of the planetary gear assembly is coupled to a rear output shaft, where the carrier supports a plurality of pinion gears. A sun gear of the planetary gear assembly is coupled to another set of discs of the clutch assembly that are coupled to the drum. When the clutch assembly is engaged, the ring gear is coupled to the sun gear for direct drive and when the band is engaged, the pinion gears and the ring gear provide underdrive.

6 Claims, 6 Drawing Sheets

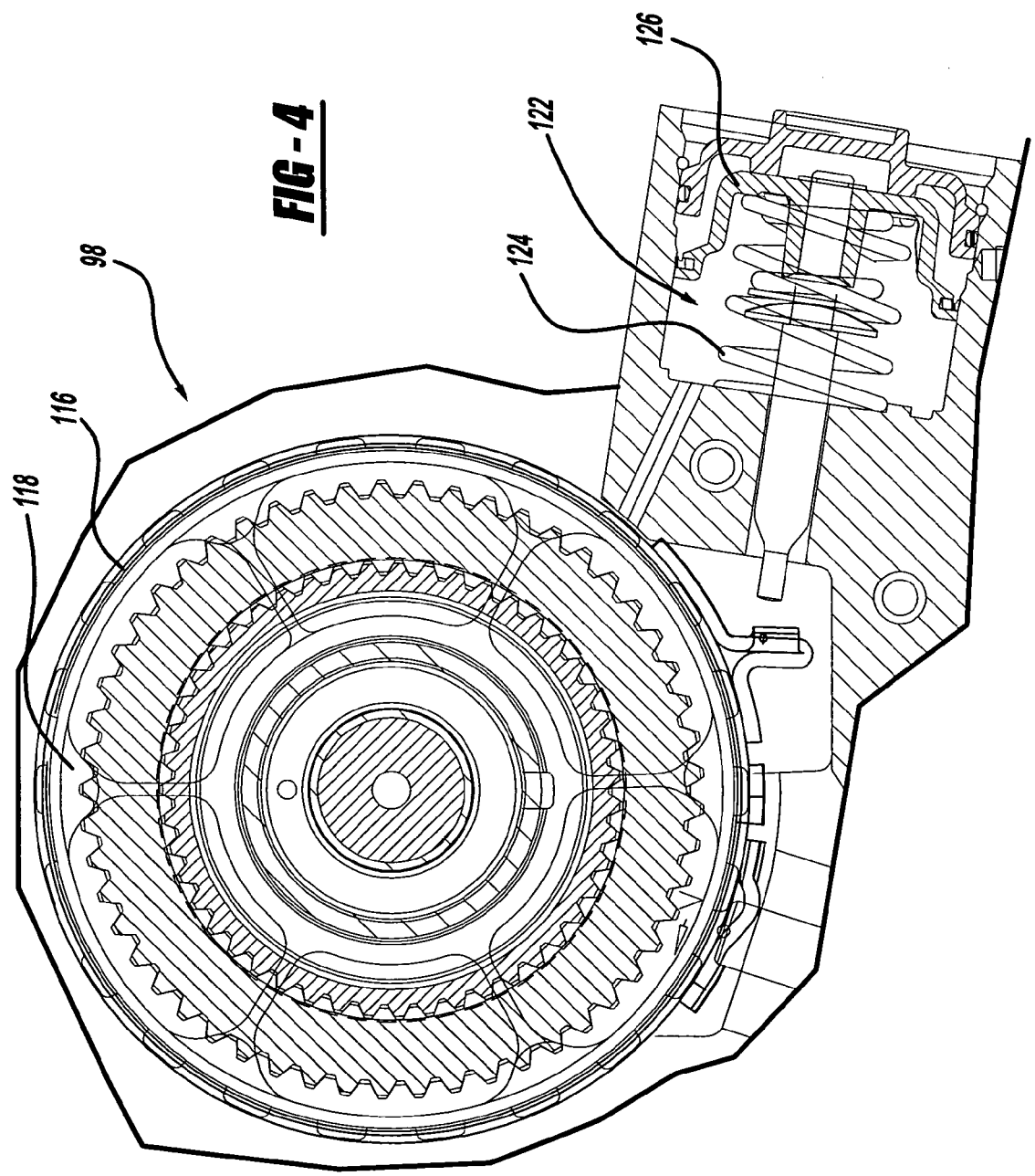

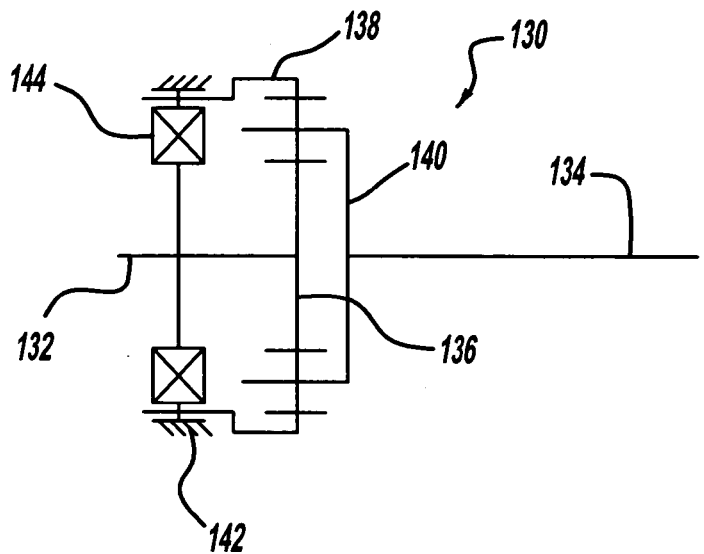
FIG - 5(a)
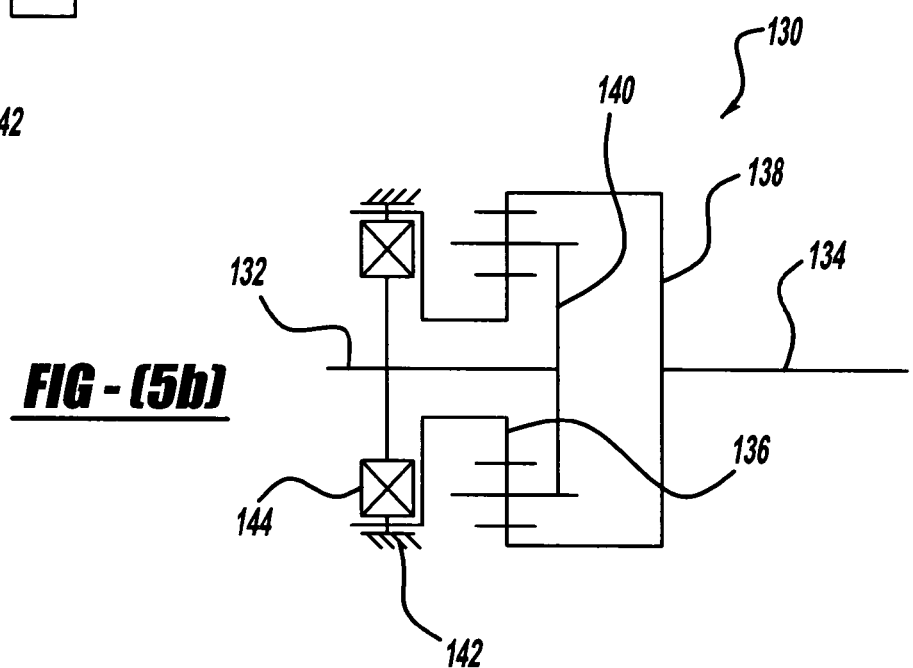
FIG - (5b)
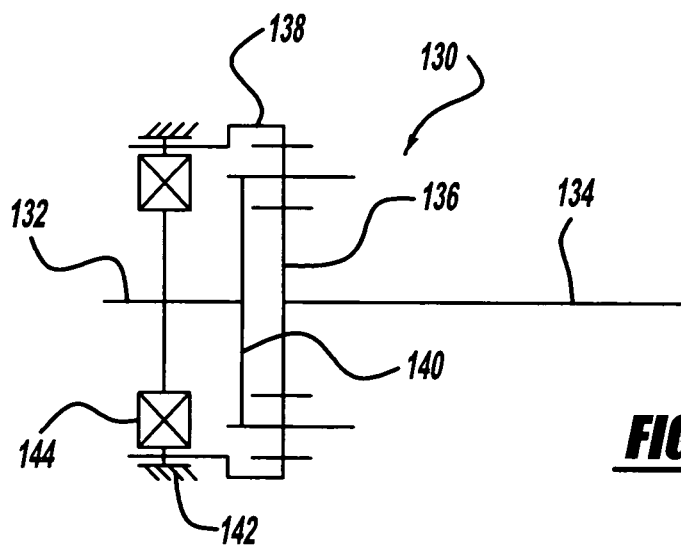
FIG - 5(c)

TRANSFER CASE WITH OVERDRIVE/UNDERDRIVE SHIFTING

CROSS-REFERENCE TO RELATED APPLICATIONS

This application claims the benefit of U.S. Provisional Application No. 60/458,486, titled Transfer Case with Overdrive/Underdrive Shifting, filed Mar. 28, 2003.

BACKGROUND OF THE INVENTION

1. Field of the Invention

This invention relates generally to a transfer case for an all-wheel drive (AWD)/four-wheel drive (4WD) vehicle and, more particularly, to a transfer case for an AWD/4WD vehicle that employs a planetary gear assembly, direct clutch assembly, and drum and band assembly that combine to provide overdrive or underdrive and direct drive so as to extend the driving gear ratios of the application.

2. Discussion of the Related Art

Various sport utility vehicles (SUV), off-road vehicles, four-wheel drive vehicles, etc. are equipped with drive modes and gear ranges that allow the vehicle to be driven in either high range or low range as well as one or more of two-wheel drive, four-wheel drive and AWD. Typically, these types of vehicles employ transfer cases having an input shaft that receives drive power from an output shaft of the vehicle's transmission. The input shaft distributes the drive power to a front output shaft that is coupled to a front drive shaft that drives the vehicle's front wheels and a rear output shaft that is coupled to a rear drive shaft that drives the vehicle's rear wheels. Known transfer cases have employed various types of couplings, such as viscous couplings, electromagnetic clutches, positionable spur gears, etc., that allow the drive power from the transmission to be distributed to the front and rear drive shafts to provide the various drive modes.

First generation transfer cases employed shift mechanisms that could only shift between the various drive modes when the vehicle was stopped. Typically, a four bar linkage was used to manually shift between drive modes using a mechanical shift actuator. Modern transfer cases sometimes employ synchronizers to synchronize the speed of the two output shafts of the transfer case prior to shifting between drive modes to allow drive mode shifts while the vehicle is moving (shift-on-the-fly). Some modern transfer cases employ synchronizers to synchronize the speed of the output shaft to either the input shaft or the output of the reduction gearset allowing range shifts to occur with the vehicle in motion as long as the transmission is shifted to neutral (shift-on-the-move).

In modern transfer cases, mechanical shift actuators have been replaced with electronically controlled shift actuators that are typically operated by an electric motor. In one known transfer case of this type, a reversible DC electric motor is employed to rotate a cammed shift actuator to selectively move two shift forks to establish the range and mode within the transfer case. The desired drive range and desired drive mode are selected by operating the motor under the control of a microprocessor-based control circuit. The microprocessor commands a motor drive circuit to energize the motor to run in either the clockwise or counter-clockwise direction to achieve the desired drive mode and range by stopping in the appropriate angular position.

An automatic vehicle transmission has a set gear range or overall ratio (OAR) that can be calculated by well known mathematical formulae for planetary or parallel shaft gearing that is designed for the desired performance of the vehicle. For example, vehicles that are designed to pull heavy loads may have a lower gear ratio range where deeper ratio gears are provided for more torque. Other vehicles may have a higher gear ratio range where lower numerical ratio gears are desired to achieve faster speeds and greater fuel economy.

Because the gear range of a transmission is set to achieve particular driving characteristics, there is no way to achieve greater torque or greater performance beyond what is available from the transmission. Therefore, it may be desirable in some designs to provide an additional underdrive or lower gear ratio and/or overdrive or higher gear ratio in combination with the set gear range of the transmission. For example, if the ratio of first gear in the transmission is 3:1 and the gear ratio of the added system is 2:1, then the overall gear ratio between the engine and the driveshafts connected to the front and rear axles would be 6:1.

SUMMARY OF THE INVENTION

In accordance with the teachings of the present invention, a transfer case for an AWD/4WD vehicle is disclosed that includes a planetary gear assembly, a disc pack clutch assembly and a band and drum assembly that provide overdrive or underdrive and direct drive. The planetary gear assembly allows the gear ratio range of a vehicle transmission to be increased beyond its set gear ratio range. In one underdrive embodiment, an input shaft of the transfer case drives an outer ring gear of the planetary gear assembly that is coupled to one set of discs of the clutch assembly. A carrier of the planetary gear assembly is coupled to a rear output shaft of the transfer case, where the carrier supports a plurality of pinion gears. A sun gear of the planetary gear assembly is coupled to another set of discs of the clutch assembly. The set of discs that is coupled to the sun gear is also coupled to the drum.

When the clutch is engaged, the disc sets of the clutch assembly are coupled together so that the sun gear is coupled to the ring gear to provide a direct drive gear ratio from the input shaft to the output shaft. When the band is engaged, the sun gear is coupled to ground through the drum, and the input torque from the ring gear is transferred to the output shaft through the carrier to provide the underdrive gear ratio.

Additional advantages and features of the present invention will become apparent to those skilled in the art from the following discussion and the accompanying drawings and claims.

BRIEF DESCRIPTION OF THE DRAWINGS

FIG. 4 is a cross-sectional view of the transfer case shown in FIG. 1 identifying the actuator for actuating a band within the transfer case;

FIGS. 5(a)–5(c) show simple stick diagrams of a transfer case, according to other embodiments of the present invention.

DETAILED DESCRIPTION OF THE EMBODIMENTS

The following discussion of the embodiments of the invention directed to a transfer case employing a planetary gear assembly for an AWD/4WD vehicle is merely exemplary in nature, and is in no way intended to limit the invention or it's applications or uses. For example, the transfer case of the invention described below provides an underdrive or overdrive gear ratio in combination with the set gear ratio range of the vehicle transmission. However, in alternate designs, a separate gear box can be coupled to the vehicle's transmission for a two-wheel drive vehicle that would not require a transfer case to extend the gear ratio range of the transmission for that vehicle.

The cost to retool an automatic transmission to add an additional gear far exceeds the cost to add an underdrive or overdrive to a transfer case according to the invention, as will be discussed below. This invention is an economical approach to achieve the aforementioned advantages by avoiding the large tooling costs of the automatic transmission modifications required. This technology can be implemented in such a way that there are no perceived differences to the vehicle operator between an additional gear in the transmission and the additional ratio within the transfer case. In a sport utility vehicle, an underdrive of this design can provide a properly stepped shifting sequence for the purposes of towing or hauling heavy loads without sacrificing the fuel economy benefit of the normal operation. In this "tow-haul" mode, which would either be driver selected or automatically detected, the gearset would be left in the underdrive mode of operation across all vehicle speeds.

Figure 1:
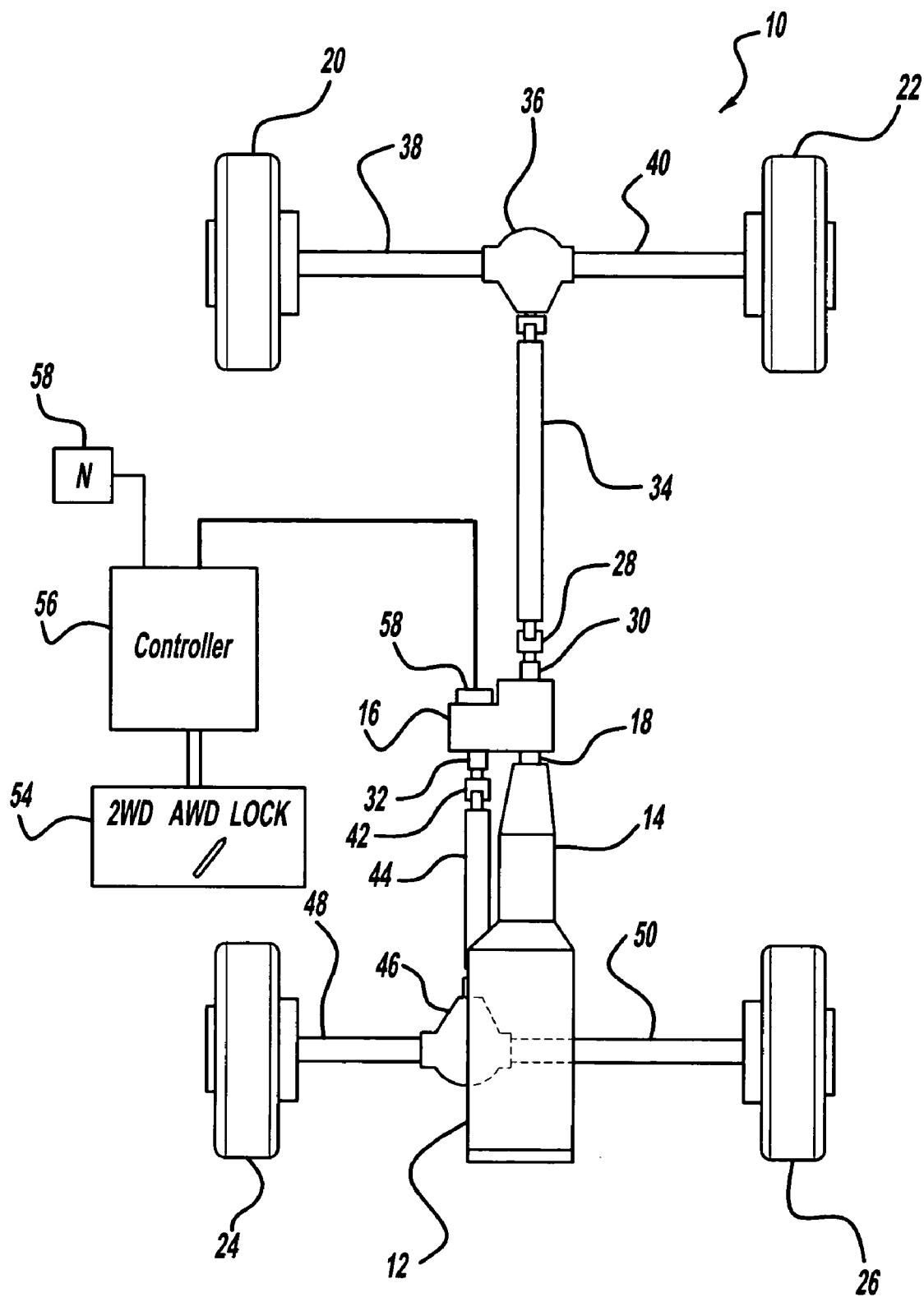
FIG. 1 is a plan view of the drive components of an AWD vehicle employing a transfer case, according to an embodiment of the present invention.

FIG. 1 is a plan view of the drive components of a vehicle 10. The vehicle 10 includes an internal combustion engine 12 that provides the power to drive the vehicle 10, as is well understood in the art. A drive shaft (not shown) is rotated by the engine 12, and is coupled to a transmission 14 that converts the output power from the engine 12 to a selectively geared output. The transmission 14 provides a set gear ratio range provided by the gears having various gear ratios that are automatically selected by a power train controller during operation of the vehicle 10. The operation of the engine 12 and the transmission 14 are well understood to those skilled in the art, and need not be discussed in detail here for a proper understanding of the invention.

The output drive power from the transmission 14 is provided to an input shaft 18 of a transfer case 16. The transfer case 16 selectively provides output drive power to a pair of rear wheels 20 and 22 and a pair of front wheels 24 and 26. The transfer case 16 allows shifts between two-wheel drive and AWD, and vice versa. In two-wheel drive, drive power is only provided to the rear wheels 20 and 22. The transfer case 16 can also be shifted to neutral if desirable, where the transfer case 16 is disengaged so that the wheels 20–26 can rotate freely for towing and the like.

The transfer case 16 includes a rear output shaft 30 and a front output shaft 32. The rear output shaft 30 is coupled to a rear drive shaft 34 by a yoke 28, and the drive shaft 34 is coupled to a rear differential 36. A first rear axle 38 is coupled at one end to the differential 36 and at an opposite end to the wheel 20. Likewise, a second rear axle 40 is coupled at one end to the differential 36 and at an opposite end to the wheel 22. The transfer case 16 provides output power on the rear shaft 30, which provides rotational energy to the rear drive shaft 34. This rotational energy is transferred through the rear differential 36 and the axles 38 and 40 to the wheels 20 and 22 in a manner that is well understood in the art.

The front output shaft 32 is coupled to a front drive shaft 44 by a yoke 42, and the drive shaft 44 is coupled to a front differential 46. A first front axle 48 is coupled at one end to the front differential 46 and at an opposite end to the wheel 24. Likewise, a second front axle 50 is coupled at one end to the front differential 46 and at an opposite end to the wheel 26. Drive energy on the front output shaft 32 drives the front drive shaft 44, and the front differential 46 transfers the drive energy to the wheels 24 and 26 through the front axles 48 and 50.

A switch 54, generally mounted on the dashboard of the vehicle 10, allows the vehicle operator to select the drive mode for two-wheel drive (2WD), AWD or a fully locked mode. The switch 54 provides a signal to a controller 56 indicating the drive mode selection. A separate neutral switch 58 can also provide a signal to the controller 56 to disengage the transfer case 16 for freewheeling. For safety purposes, the switch 58 is separate from the switch 54, and typically requires special requirements to be activated. The controller 56 provides an electrical input to a clutch that provides the required rotational energy through an upper sprocket, chain, lower sprocket, shaft and yoke creating the desired mode, as will be described below and as is well understood in the art.

Figure 2:
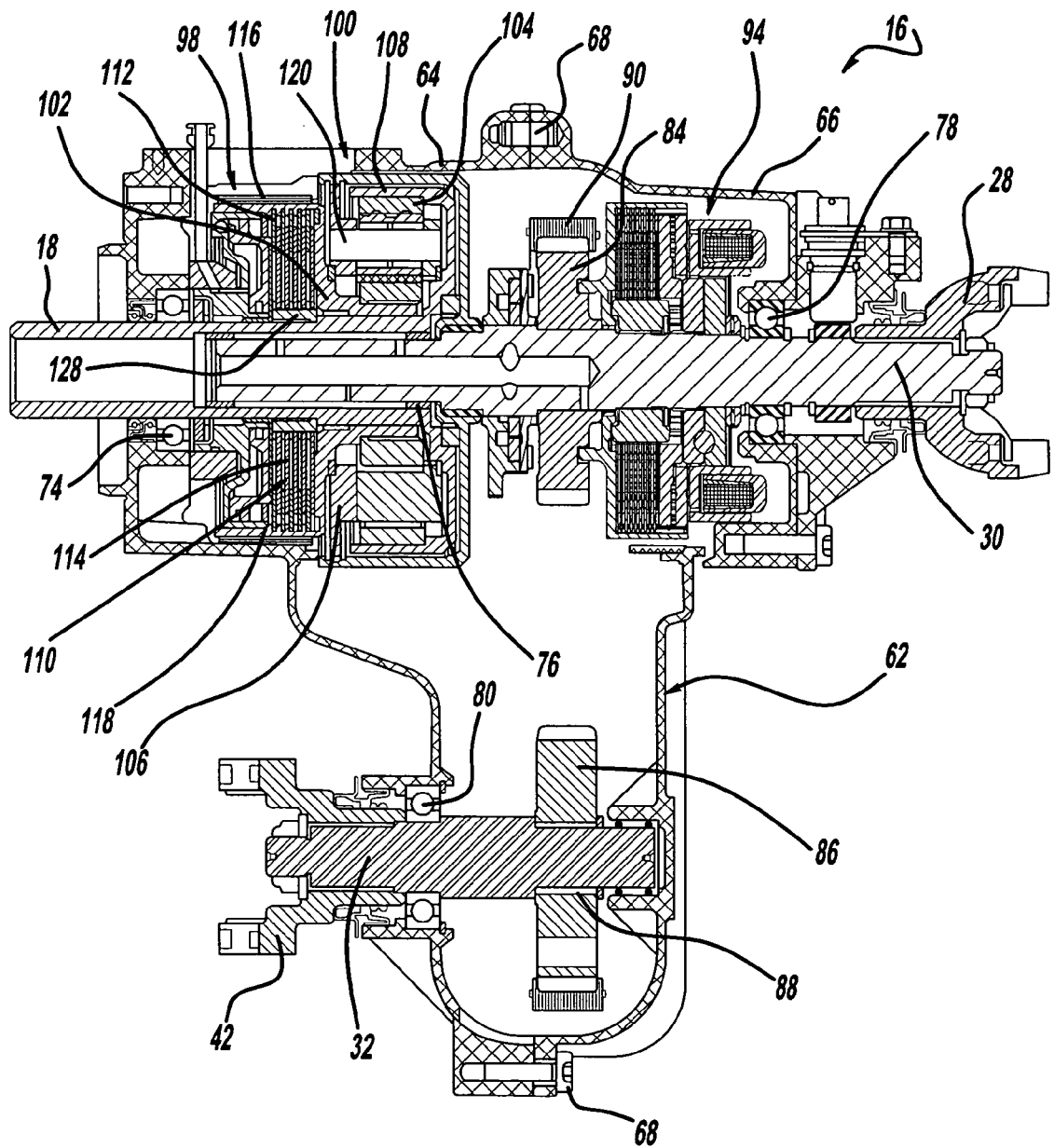
FIG. 2 is a cross-sectional view of the transfer case of the invention shown in FIG. 1.

FIG. 2 is a cross-sectional view of the transfer case 16 separated from the vehicle 10. The input shaft 18, the rear output shaft 30 and the front output shaft 32 extend from an outer housing 62 of the transfer case 16, as shown. The housing 62 includes two housing halves 64 and 66 secured together by bolts 68. The housing 62 includes various seals, recesses, shoulders, flanges, bores, etc. that accept and position the various components and parts of the transfer case 16 discussed herein. The input shaft 18 is rotatably coupled within the housing 62 on ball bearings 74, and is coupled to the rear output shaft 30 by bearings 76 for the AWD, two-wheel drive and fully locked modes. The rear output shaft 30 is rotatably mounted on ball bearings 78 at an opposite end from the input shaft 18. The front output shaft 32 is rotatably mounted within the housing 62 on ball bearings 80.

An upper output sprocket 84 is selectively driven through a clutch 94 by the rear output shaft 30 and is concentric therewith. A lower output sprocket 86 is rigidly coupled to the front output shaft 32 by cooperating splines 88 and rotates therewith. A chain 90 is coupled to the sprockets 84 and 86. When the transfer case 16 is in the two-wheel drive mode, the sprocket 84 rotates freely on the output shaft 30, and thus no output drive power is applied to the front output shaft 32.

To initiate the AWD/4WD mode, the clutch 94 is activated to controllably and selectively provide rotational energy to the upper rear output sprocket 84 so that it will provide rotational energy as needed or as selected to the front wheels 24 and 26 through the series of rotationally coupled parts. In this mode, the shafts 34 and 44 may be allowed to rotate at different speeds for smooth vehicle handling. When the clutch 94 is fully engaged with the sprocket 84, the clutch 94 and the sprocket 84 will be fully coupled and rotate at the same speed to establish the fully locked mode. In the fully locked mode, the shafts 34 and 44 are not allowed to rotate at different speeds resulting in a mode for maximum traction. The clutch 94 can be any clutch suitable for the purposes described herein, and one of ordinary skill in the art will readily recognize that several suitable clutches are known in the art.

Figure 3:
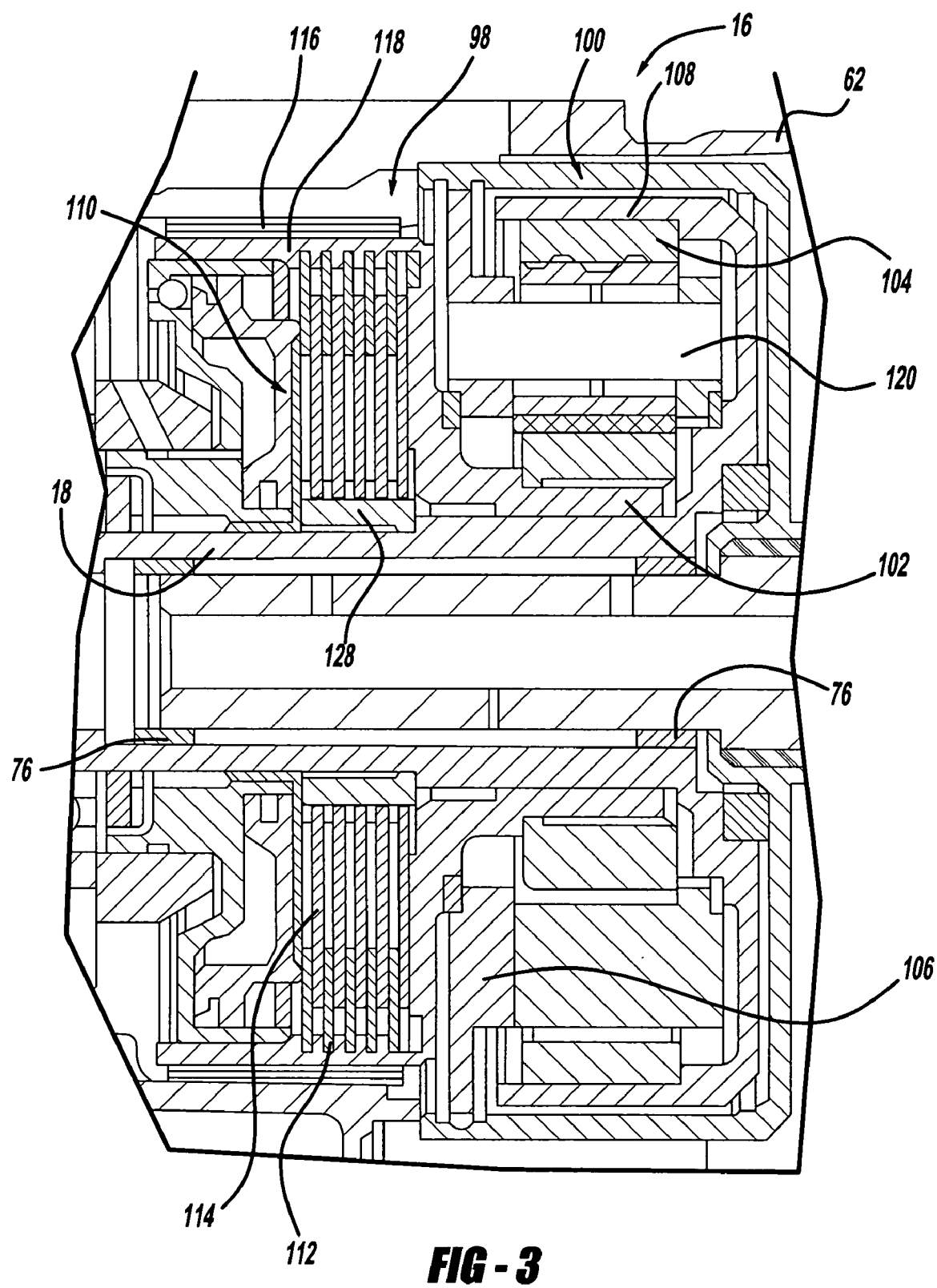
FIG. 3 is a close-up view of a portion of the transfer case shown in FIG. 2 depicting a planetary gear assembly, according to the invention.

According to the invention, the transfer case 16 includes a planetary gear assembly 100, a direct clutch assembly 110 and a drum and band assembly 98 for providing underdrive or overdrive and direct drive to extend the gear ratio range of the transmission 14 to provide additional torque at lower speeds or better fuel economy at higher speeds. In the embodiment shown, the transfer case 16 provides underdrive and direct drive. FIG. 3 is a close-up view of a portion of the transfer case 16 more clearly showing the planetary gear assembly 100, the direct clutch assembly 110 and the drum and band assembly 98.

The planetary gear assembly 100 includes a sun gear 102, a plurality of pinion gears 104 mounted to a common carrier 106 by pinions 120, and a ring gear 108. The sun gear 102 includes gear teeth that mesh with gear teeth on the pinion gears 104, and the pinion gear teeth mesh with gear teeth on the ring gear 108. The operation of a planetary gear assembly of this type is well understood to those skilled in the art, and need not be discussed in significant detail herein for a proper understanding of the invention. The direct clutch assembly 110 includes a set of outer clutch plates 112 and a set of inner clutch plates 114. The drum and band assembly 98 includes a hydraulically activated band 116 wound around a drum 118. The outer clutch plates 112 are rotationally coupled to the drum 118 and rotate therewith.

FIG. 4 is a partial cross-sectional view of the transfer case 16 to more clearly depict the drum and band assembly 98. In this veiw, the band 116 is coupled to band actuator 122 including a spring 124. Hydraulic pressure applied to a plate 126 against the bais of the spring 124 causes the band 116 to compress around the drum 118 for the purposes discussed below.

The ring gear 108 is rigidly coupled to the input shaft 18 and rotates therewith. The input shaft 18 is also rotationally and slidably coupled to the inner clutch plates 114 by a hub 128. Particularly, the hub 28 is coupled to the inner clutch plates 114 by splines and to the input shaft 18 by splines. The carrier 106 is rigidly coupled to the output shaft 30 and rotates therewith. The sun gear 102 is rigidly coupled to the outer clutch plates 112, and thus to the drum 118. When neither the band 116 or the clutch assembly 110 are activated, the planetary gear assembly 100 freewheels relative to the input shaft 18, and no torque is delivered to the output shaft 30. When the clutch assembly 110 is engaged, the clutch plates 112 and 114 are coupled together, which couples the ring gear 108 and the sun gear 102 together. Thus, the input shaft 18 is coupled to the output shaft 30 in a 1:1 gear ratio providing the direct drive from the vehicle transmission 14.

When the clutch assembly 110 is disengaged and the band 116 is hydraulically engaged to the drum 118, the sun gear 102 is coupled to the housing 62 or ground. In this configuration, the input torque from the input shaft 18 applied to the ring gear 108 is delivered to the output shaft 30 through the gear ratio between the pinion gears 104, the sun gear 102 and the ring gear 108 to provide the underdrive gear ratio, i.e., a lower gear ratio than is provided by the transmission 14. In this embodiment, the gear ratio between the pinion gears 104 and the ring gear 108 provides a 1.61:1 underdrive gear ratio.

Tables I and II below give the change to the gear ratio range for two known transmissions, particularly the 4L60-E and 4L80-E transmissions, if they incorporated a transfer case according to the invention. Particularly, Table I gives the first, second, third and fourth gear ratios and the overall ratio (OAR) of these transmissions. Table II gives the first, second, third, fourth and fifth gear ratios and the overall ratio for these transmissions in combination with the transfer case of the invention. Particularly, the 4L60-E transmission has been combined with an overdrive transfer case and the 4L80-E transmission has been combined with an underdrive transfer case. The overdrive gear for the 4L60-E transmission is the fifth gear provided by the transfer case, and the underdrive gear for the 4L80-E transmission is the first gear provided by the transfer case. The overdrive transfer case has an overdrive gear ratio of 0.83:1 and the underdrive transfer case has an underdrive gear ratio of 1.61:1. As shown, the overall ratio of the 4L60-E transmission with the overdrive transfer case is extended to 5.28:1 and the overall ratio of the 4L80-E transmission with the underdrive transfer case is extended to 5.32:1.

TABLE I

| | Current Transmission | |
|---|---|---|
| | 4L60-E | 4L80-E |
| 1st | 3.06 | 2.48 |
| 2nd | 1.63 | 1.6 |
| 3rd | 1 | 1 |
| 4th | 0.69 | 0.75 |
| OAR | 4.43 | 3.31 |

TABLE II

| | Transmission with Proposed Transfer Case | |
|---|---|---|
| | Add Overdrive | Add Underdrive |
| T-Case Ratio | 0.83 | 1.61 |
| T-Case Shift | 4–5 | 1–2 |
| 1st | 3.06 | 3.99 |
| 2nd | 1.63 | 2.48 |
| 3rd | 1 | 1.6 |
| 4th | 0.69 | 0.75 |
| 5th | 0.58 | 0.75 |
| OAR | 5.28 | 5.32 |

Table III below show examples of how the sun gear 102, the ring gear 108 and the carrier 106 can be mounted to the input shaft 18 (input), the rear output shaft 30 (output) and the housing 60 (ground) to provide various gear ratios for both overdrive and underdrive, according to the invention. Particularly, Table III provides transfer case gear ratios for a 2.64 gear set, where the first row provides a 2.64 gear ratio and the second row provides a 1.61 gear ratio for underdrive, and the third row provides a 0.62 gear ratio and the fourth row provides a 0.38 gear ratio for overdrive.

TABLE III

| Input | Output | Ground | Ratio |
|---|---|---|---|
| Sun | Carrier | Ring | 2.64 |
| Ring | Carrier | Sun | 1.61 |
| Carrier | Ring | Sun | 0.62 |
| Carrier | Sun | Ring | 0.38 |

As discussed above, the transfer case 16 provides a 1.61:1 underdrive gear ratio. Based on the discussion above, one of skill in the art would readily understand how to provide other underdrive gear ratios for different applications, as well as overdrive gear ratios, such as those described in Table III, consistent with the invention.

FIGS. 5(a)–5(c) are "stick diagrams" of a transfer case 130 for the other three ratios shown in Table III, particularly the gear ratios 2.64, 0.62 and 0.38, respectively. FIGS. 5(a)–5(c) show how the sun gear, the carrier and the ring gear are coupled to the input, output and ground as depicted in Table III. Reference numeral 132 represents the input shaft, reference numeral 134 represents the output shaft, reference numeral 136 represents the sun gear, reference numeral 138 represents the ring gear, reference numeral 140 represents the carrier, reference numeral 142 represents the band and reference numeral 144 represents the clutch.

Figure 6:
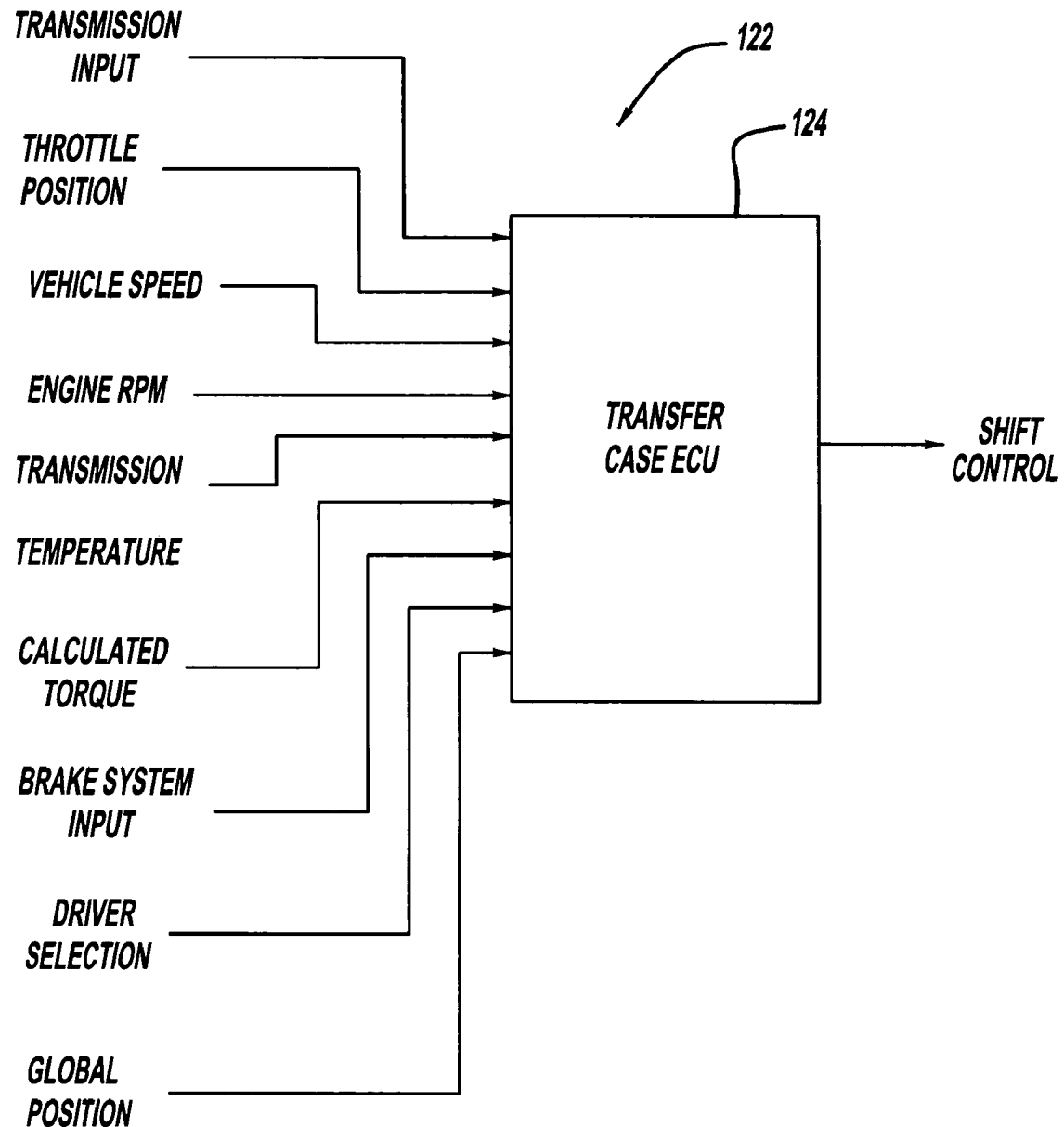
FIG. 6 is a block diagram of an electronic control unit for the transfer case shown in FIG. 1.

FIG. 6 is a block diagram 122 of an electronic control unit (ECU) 124 for the transfer case 16 discussed above. A shift control output is provided by the ECU 124 that controls the direct clutch assembly 110 and the band and drum assembly 98 based on the several inputs applied to the ECU 124.

As discussed above, the transfer case 16 provides an additional underdrive gear or overdrive gear in combination with the gear ratios provided by the transmission 14. The shift provided by the transfer case 16 can be controlled by the vehicle controller, or a switch can be provided to allow the vehicle operator to select the extra gear in alternate embodiments. Further, the addition of a separate gear can be provided in another gear unit or gear box other than the transfer case 16 behind the transmission 14, such as for two-wheel drive vehicles.

The foregoing discussion describes merely exemplary embodiments of the present invention. One skilled in the art would readily recognize that various changes, modifications and variations can be made therein without departing from the spirit and scope of the invention as defined in the following claims.

What is claimed is:

1. A transfer case comprising:
    an input shaft coupled to a transmission of a vehicle;
    an output shaft selectively coupled to the input shaft;
    a planetary gear assembly for transferring drive torque from the input shaft to the output shaft, said planetary gear assembly including a sun gear, a ring gear and a plurality of pinion gears mounted to a common carrier, said sun gear and said ring gear meshing with the plurality of pinion gears;
    a direct clutch assembly including a first set of clutch plates and a second set of clutch plates, wherein when the clutch assembly is activated, the first and second set of clutch plates are coupled together;
    a drum and band assembly including a drum and a band, wherein the band is engaged to prevent the drum from rotating, and wherein the combination of the planetary gear assembly, the direct clutch assembly and the drum and band assembly provide a selectable gear ratio where the gear ratio of the transfer case combines with the transmission of the vehicle to extend the gear ratio range of the vehicle by providing an underdrive gear ratio and a direct drive gear ratio or an overdrive gear ratio and a direct drive gear ratio in addition to gear ratios provided by the transmission; and
    the input shaft is coupled to the ring gear, the output shaft is coupled to the carrier and the sun gear is coupled to the first set of clutch plates and the drum, and wherein engaging the band couples the sun gear to ground to provide the underdrive gear ratio from the ring gear through the carrier to the output shaft, and wherein activating the clutch assembly couples the sun gear to the ring gear to provide the direct drive gear ratio from the input shaft to the output shaft.

2. The transfer case according to claim 1 wherein the underdrive gear ratio is 1.61:1.

3. The transfer case according to claim 2 wherein the underdrive gear ratio provides an overall gear ratio range of 5.32:1 in combination with a vehicle transmission.

4. The transfer case according to claim 1 wherein the transfer case provides an underdrive gear ratio or an overdrive gear ratio selected from the group consisting of 2.64:1, 1.61:1, 0.60:1, 0.40:1, 2.48:1, 1.67:1 and 0.60:1.

5. The transfer case according to claim 1 wherein the transfer case provides a vehicle drive mode for all-wheel drive and two-wheel drive.

6. The transfer case according to claim 1 wherein the underdrive gear ratio or the overdrive gear ratio is selectively engaged either automatically or by a operator input switch.

* * * * *